United States Patent [19]

Fast

[11] Patent Number: 5,422,644
[45] Date of Patent: Jun. 6, 1995

[54] HARD-WIRED CONTROLLED/MONITOR

[75] Inventor: Bryan Fast, Wareham, United Kingdom

[73] Assignee: United Kingdom Atomic Energy Authority, Didcot, England

[21] Appl. No.: 124,446

[22] Filed: Sep. 22, 1993

Related U.S. Application Data

[63] Continuation of Ser. No. 782,296, Oct. 24, 1991, abandoned.

[30] Foreign Application Priority Data

Nov. 22, 1990 [GB] United Kingdom ............... 9025480

[51] Int. Cl.⁶ .............................................. H03M 1/12
[52] U.S. Cl. ....................................... 341/155; 341/93
[58] Field of Search ............... 341/155, 120, 118, 119, 341/139, 142, 158; 364/571.01, 571.02, 571.03, 571.04, 571.05, 550

[56] References Cited

U.S. PATENT DOCUMENTS 3,689,753 9/1972 Williams.
4,075,707 2/1978 Wilmer.
4,133,036 1/1979 Watson .............................. 364/477
4,151,517 4/1979 Kelly ................................. 341/143
4,206,507 6/1980 Payling.
4,852,046 7/1989 Jones.

FOREIGN PATENT DOCUMENTS 1321989 7/1973 United Kingdom.
1477208 6/1977 United Kingdom.
2012074 7/1979 United Kingdom.
1579775 11/1980 United Kingdom.

Primary Examiner—Brian K. Young
Attorney, Agent, or Firm—William R. Hinds

[57] ABSTRACT

A hard-wired circuit (25) is provided for controlling or for monitoring a plant or process (12). The circuit incorporates means (14) to sense the current state of the process, an input encoder (16) to generate multi-digit binary coded signals representing that sensed state, and an output encoder (18) to generate multi-digit binary output coded signals corresponding to the signals from the input encoder (16), which output signals can be used to control process or plant actuators. Both the input encoder (16) and the output encoder (18) may be PROMs. A complement modulator (20) activated by an oscillator (24) may be used to provide dynamic output signals; and by means of appropriate comparators (26, 38) and watchdogs (28, 40) the input and output coded signals may be verified.

6 Claims, 3 Drawing Sheets

HARD-WIRED CONTROLLED/MONITOR this is a continuation of application Ser. No. 07/782,296, filed Oct. 24, 1991, now abandoned.

This invention relates to a controller/monitor for controlling or monitoring operation of a plant or of a process.

To ensure correct operation, a plant or a process may be monitored by electronic circuitry, which may incorporate software. This may for example monitor whether the plant or the process is in an acceptable (e.g. safe) state, monitor whether a sequence of successive states is correct, or control the sequence of successive states. However, where safety systems require software, questions may arise as to the predictability or reliability of the software and therefore of the safety system itself.

In U.S. Pat. No. 4,852,046 (Jones), there is disclosed an electronic controller for a gas burner in which data inputs representing the current status of the burner are supplied to an EPROM; the EPROM outputs corresponding data signals which control the burner by means of relays. There is no dynamic output, and the input signals are not themselves checked. In U.S. Pat. No. 4,206,506 (Payling), a programmable ROM is used to control, for example, a water heater. Input signals representing the current conditions are supplied, possibly via an optical isolator, to the ROM, and its outputs are supplied to relays to control operation. Again, there is no dynamic output, and the input signals are not themselves checked.

According to the present invention there is provided a hard-wired controlling or monitoring circuit comprising: means for sensing the current state of a plant or process; means for generating first multi-digit binary coded signals representing the sensed current state; and means to generate multi-digit binary output coded signals corresponding to the first coded signals.

The output coded signals may be used to actuate means for changing the state of the plant or the process, or may be compared to output signals from a different controller so as to provide a check on the correct operation of the latter. By hard-wired is meant that the circuit does not utilize software; for example the coded signals may be generated by programmable read-only memories (PROMs) or by programmable logic devices (PLDs). The operation of such devices is limited to performing logical input/output transformations, but correct operation under all circumstances is verifiable.

Preferably the circuit also comprises: means for generating a sequence of second multi-digit binary coded signals each representing a permissible successive state of the plant or the process; means for comparing the first and the second coded signals; and means responsive to signals from the comparison means to cause the second coded signal generating means to generate the coded signals representing the next successive permissible state if the first and the second coded signals are different.

To ensure fail-safe operation, it is desirable to arrange that each non-zero digit of the output coded signals alternates. This may be accomplished by means for alternately converting each digit of a multi-digit coded signal to its complement at a desired frequency, this means operating on the first or the second multi-digit coded signals, prior to their receipt by the comparison means. The output code generating means is arranged to generate no output (i.e. all output digits at the same value e.g. zero) except when it receives the complement of a first or second coded signal. Each digit of the output coded signal relates to a particular output function or actuator. In the preferred embodiment such an alternating output is generated only if the first and the second code signals are the same.

Preferably, as a further check on correct operation, the circuit also comprises means for generating from the output coded signals multi-digit checking coded signals representing the signals to which the output coded signals correspond; and means for comparing the checking coded signals with the first coded signals.

In accordance with one aspect, the invention provides a hard-wired controlling or monitoring circuit comprising: a plurality of sensor means for sensing parameters relating to the current state of a plant or process and for providing sensor signals indicative of those parameters; means for generating, in response to the sensor signals, first multi-digit binary coded signals representing the sensed current state; means to generate multi-digit binary output coded signals corresponding to the first coded signals, the output coded signals being the requisite signals for controlling the plant or process; a complement generating means to which the first coded signals are supplied, the complement generating means generating as its output multi-digit signals which alternate, at a preset frequency, between being the same as the first coded signals and being the complements of the first coded signals, the output from the complement generating means being supplied as input signals for the output signal generating means, the output signal generating means generating all-zero outputs in response to one or other of the signals received from the complement generating means, so that each non-zero digit of the output coded signals alternates during operation.

In accordance with another aspect, the invention provides a hard-wired controlling or monitoring circuit comprising: a plurality of sensor means for sensing parameters relating to the current state of a plant or process and for providing sensor signals indicative of those parameters; means for generating, in response to the sensor signals, first multi-digit binary coded signals representing the sensed current state; means for generating a sequence of second multi-digit binary coded signals each representing a permissible successive state of the plant or the process; means for comparing the first coded signals and the second coded signals; means responsive to signals from the comparison means to cause the second coded signal generating means to generate coded signals representing the next successive permissible state if the first coded signals and the second coded signals are different; means to generate multi-digit binary output coded signals corresponding to the first coded signals, the output coded signals being the requisite signals for controlling the plant or process; and a complement generating means to which either the first coded signals or the second coded signals are supplied, the complement generating means generating as its output multi-digit signals which alternate, at a preset frequency, between being the same as the signals supplied thereto and being the complements of the signals supplied thereto, the output from the complement generating means being supplied as input signals for the output signal generating means, the output signal generating means generating all-zero outputs in response to one or other of the signals received from the complement generating means, so that each non-zero digit of the output coded signals alternates during operation.

The invention will be further described by way of example only and with reference to the accompanying drawings, in which.

Figure 1:
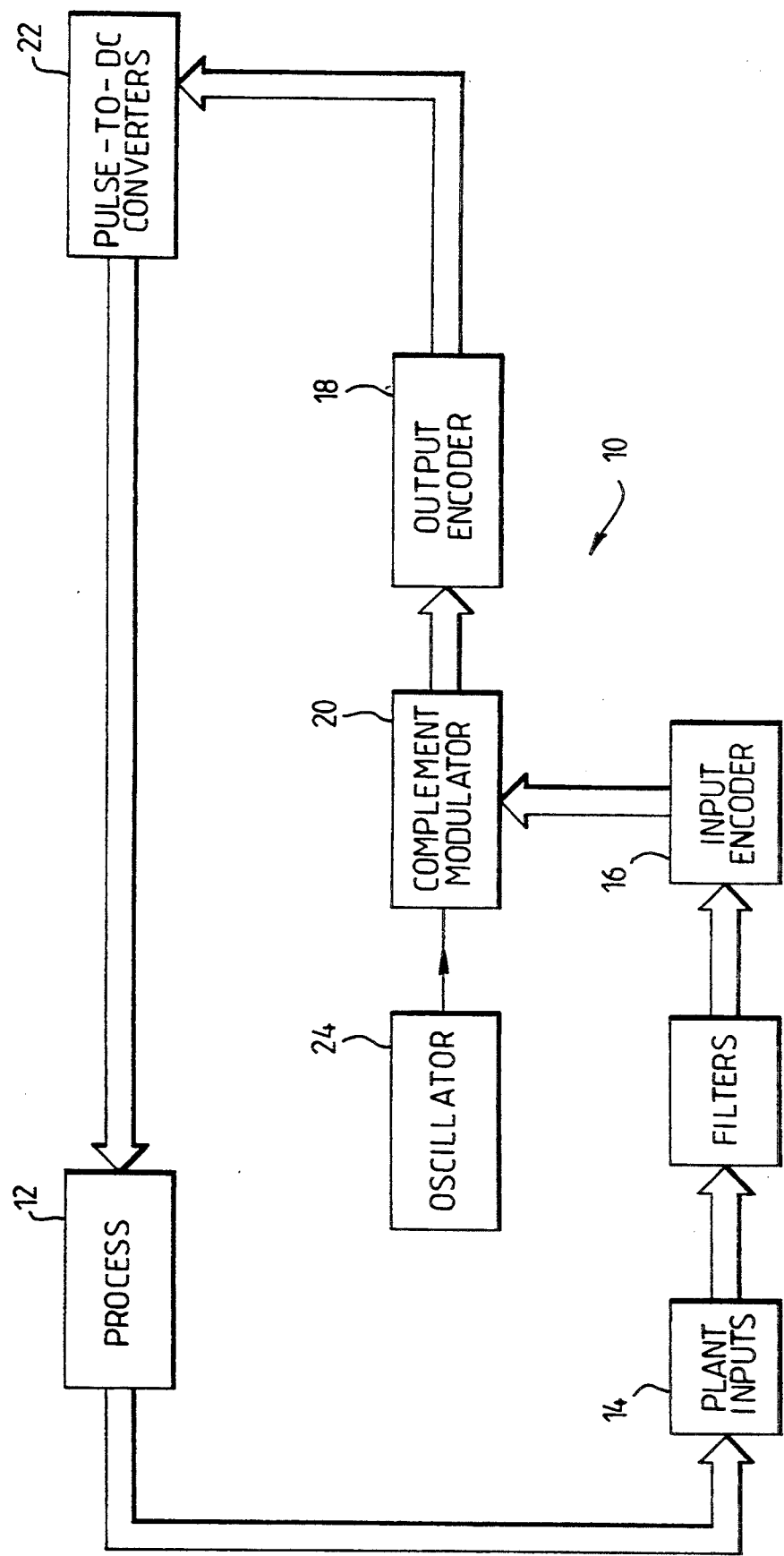
FIG. 1 shows a block diagram of a hard-wired controlling circuit.

Referring to FIG. 1 there is shown a block diagram of a hard-wired circuit 10 for controlling operating of a process represented by block 12. Sensors 14 provide signals representing the current state of the process or of the plant in which the process is taking place; by way of example these sensors 14 might measure temperature or pressure, or might indicate whether a valve is open or shut. The circuit 10 is of general applicability, and the nature of the plant or the process is not an aspect of the invention. The signals from the sensors 14, after being filtered, are received by an input encoder 16.

The encoder 16 is a programmable read-only memory (PROM) which generates first eight-digit binary coded signals which represent unambiguously the state of the process 12. The role of the circuit 10 is to provide control signals to energise appropriate actuators (not shown) and so to control the process 12, in response to a determination of its current state, and these control signals are provided by an output encoder 18 to which the first coded signals are provided via a complement modulator 20. The output encoder 18 is also a PROM. It provides eight digit binary output signals, which are supplied via respective pulse-to-dc converters 22 to the actuators. The output encoder 18 is programmed to provide an appropriate eight digit code corresponding to the received first coded signals. The complement modulator 20, when energised, inverts each digit of the first coded signals (so 1 becomes 0, and 0 becomes 1); and it is energised by an oscillator 24 at a frequency of 10 kHz. The outputs from the encoder 18 are all zeros except when such a complemented signal is received. Consequently each non-zero digit of the output binary code provides a 10 kHz alternating, and hence dynamic, output signal.

Figure 2:
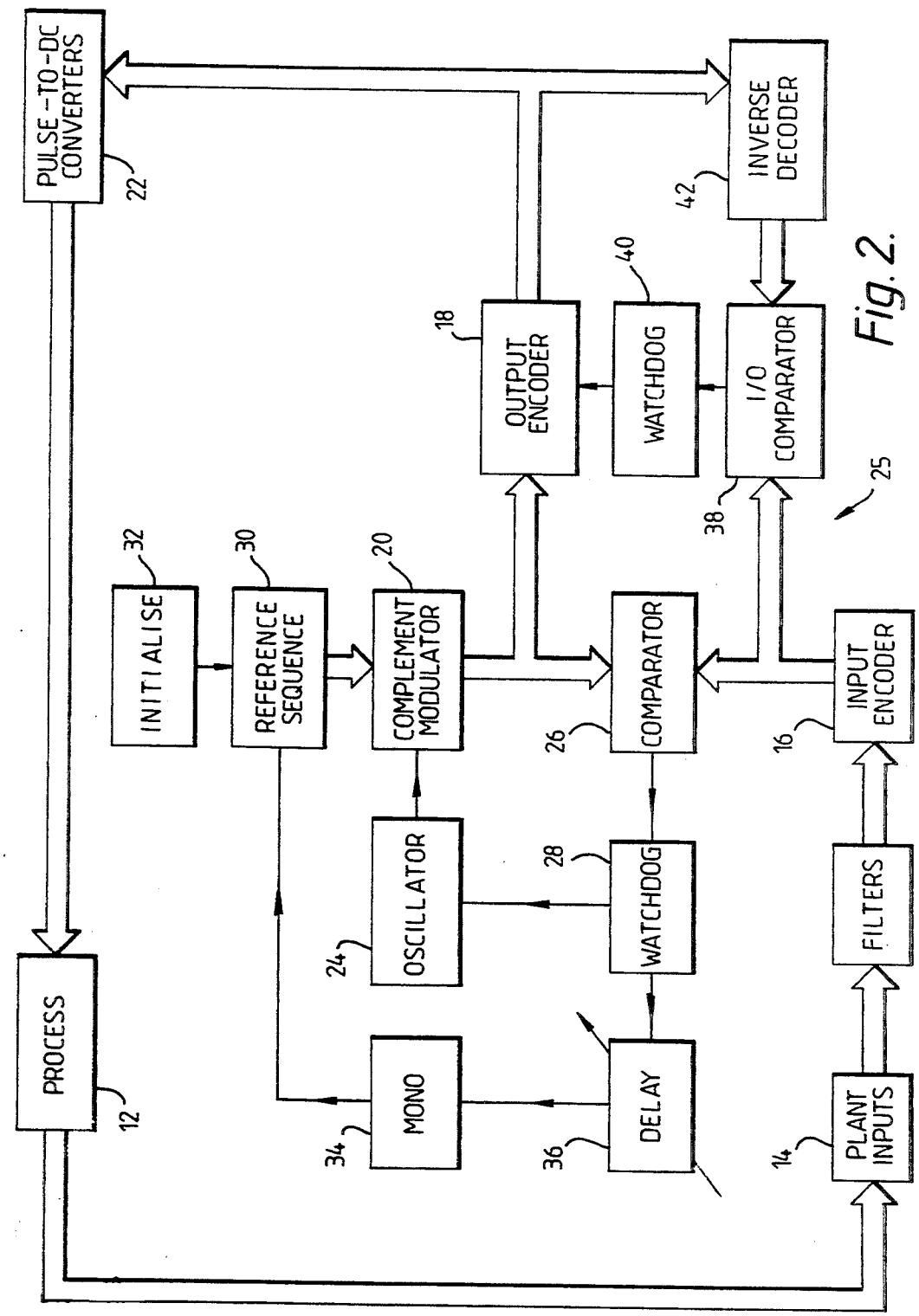
FIG. 2 shows a block diagram of a modification to the circuit of FIG. 1.

Referring now to FIG. 2, there is shown a hard-wired circuit 25 incorporating modifications to the circuit 10 of FIG. 1 to provide for verification of the input code and also verification of the output code. Those components which are the same as those of the circuit 10 are referred to by the same reference numbers. The current state of the process or plant 12 is sensed by sensors 14, whose signals are filtered and provided to an input encoder 16. The encoder 16 generates first eight-bit (eight-digit binary) coded signals which represent unambiguously the current state of the process 12.

The signals from the input encoder 16 are supplied to a comparator 26 which provides an output signal to a retriggerable monostable or watchdog unit 28; the comparator 26 receives another eight-bit coded signal via a complement modulator 20 from a reference code generator 30. The code generator 30 is a PROM arranged to generate an eight bit output representing an expected and permissible state of the process 12; means 32 ensures that when operation starts the code generator 30 is initialised to generate output representing the initial state of the process 12, and on receipt of a pulse from a monostable 34 the generator 30 output changes to represent the next expected state of the process. The complement modulator 20 is energised at a frequency of 10 kHz by an oscillator 24 which is itself activated by a signal from the watchdog unit 28. As in the circuit 10, the output from the complement modulator 20 is also supplied to an output encoder 18, and the output encoder 18 generates corresponding eight digit binary control signals which are supplied via respective pulse-to-dc converters 22 to actuators which control the process 12.

In operation, as long as the process 12 is an expected state and the input encoder 16 has generated the correct eight digit code, then the eight digit codes from the encoder 16 and from the reference code generator 30 will be the same. Because of the operation of the complement modulator 20 the output encoder 18 will produce output signals corresponding to the signals from the input encoder 16, each non-zero digit being a 10 kHz square-wave and so dynamic, as discussed-above in relation to the circuit 10; in addition the comparator 26 generates a 10 kHz square wave output signal (i.e. the received eight digit codes alternately match, and then don't match). As long as the watchdog unit 28 receives this square wave signal it keeps the oscillator 24 activated. If the state of the process 12 changes, the eight digit signals from the input encoder 16 will also change and will no longer match those from the reference code generator 30. The watchdog unit 28 will deactivate the oscillator 24, so de-energising the complement modulator 20 so the signals from the output encoder 18 are all zero and are no longer dynamic. After a delay set by unit 36 the monostable 34 provides a pulse to the reference code generator 30, which therefore starts to generate the eight digit code representing the next expected state of the process 12. These signals should match the new signals from the input encoder 16, so the comparator 26 will supply a signal to the watchdog unit 28, so reactivating the oscillator 24, so re-energising the complement modulator 20, and so re-establishing dynamic outputs from the encoder 18 with a new eight digit output code. This arrangement hence verifies that the input code signals are correctly generated.

The signals from the input encoder 16 are also supplied to an input/output comparator 38. The output signal from the comparator 38 is supplied to a watchdog unit 40 (retriggerable monostable) which provides a signal to enable the output encoder 18 to operate. The input/output comparator 38 also receives eight-digit binary coded signals from an inverse decoder 42 to which are supplied the output coded signals from the output encoder 18. The inverse decoder 42 is a programmable logic device (PLD) programmed to generate an eight digit binary code representing the complement of those signals in response to which the output signals are generated, i.e., representing the signals to which the output coded signals from the output encoder 18 correspond.

As long as the output encoder 18 is operating correctly the signals from the inverse decoder 42 should of course be the same as those from the reference code generator 30, and so (except as described earlier during the change from one reference code to the next) should be the same as those from the input encoder 16. Because the output signals from the encoder 18 are dynamic, the input/output comparator 38 generates a 10 kHz square wave output signal, which keeps the watchdog unit 40 triggered, and so enables the output signals to be supplied to the pulse-to-dc converters 22. The watchdog unit 40 may have a time constant long enough that the output encoder 18 remains enabled throughout the change from one reference code to the next, or it may be provided with a reset signal from the watchdog unit 28 when that is retriggered. This arrangement provides a further check on operation of the circuit 25, verifying that the output signals are correctly generated. It will be appreciated that there must be no ambiguity, that is to say that any one output code must not be demanded by more than one input code.

It will be appreciated that the circuits 10 and 25 may be modified in various ways while remaining within the scope of the invention. For example the encoders and decoders incorporating the necessary lock-up tables (i.e. input encoder 16, output encoder 18, and inverse decoder 42) might consist of different hard-wired devices, as in each case PROMs can be replaced by PLDs and vice versa. The code generator 30 might be a binary counter or a Gray code counter instead of a PROM. The circuit 25 is arranged to ensure the states of the process 12 follow a preset sequence corresponding to the successive code signals generated by the reference code generator 30; alternatively the reference code generator 30 might be arranged to scan through codes representing all expected states of the process 12 until a match with the input code is found. Where several actuators need to be controlled it may be necessary to generate more than eight digits of binary output signals. This may be achieved by supplying the signals from the complement modulator 20 to two or more output encoders 18, which provide the necessary control signals to different actuators or to different sets of actuators. As in the circuit 25 of FIG. 2 the operation of each output encoder 18 may be checked by a respective inverse decoder 42 and a respective input/output comparator 38; preferably the output signals from all the comparators 38 are supplied to a single, common watchdog unit, which provides enabling signals to all of the output encoders 18 only if triggered by all the comparators 38. Hence only if all the encoders 18 operate correctly will signals be provided to the actuators. It will also be appreciated that the number of binary digits in each coded signal might differ from the value eight stated above.

Figure 3:
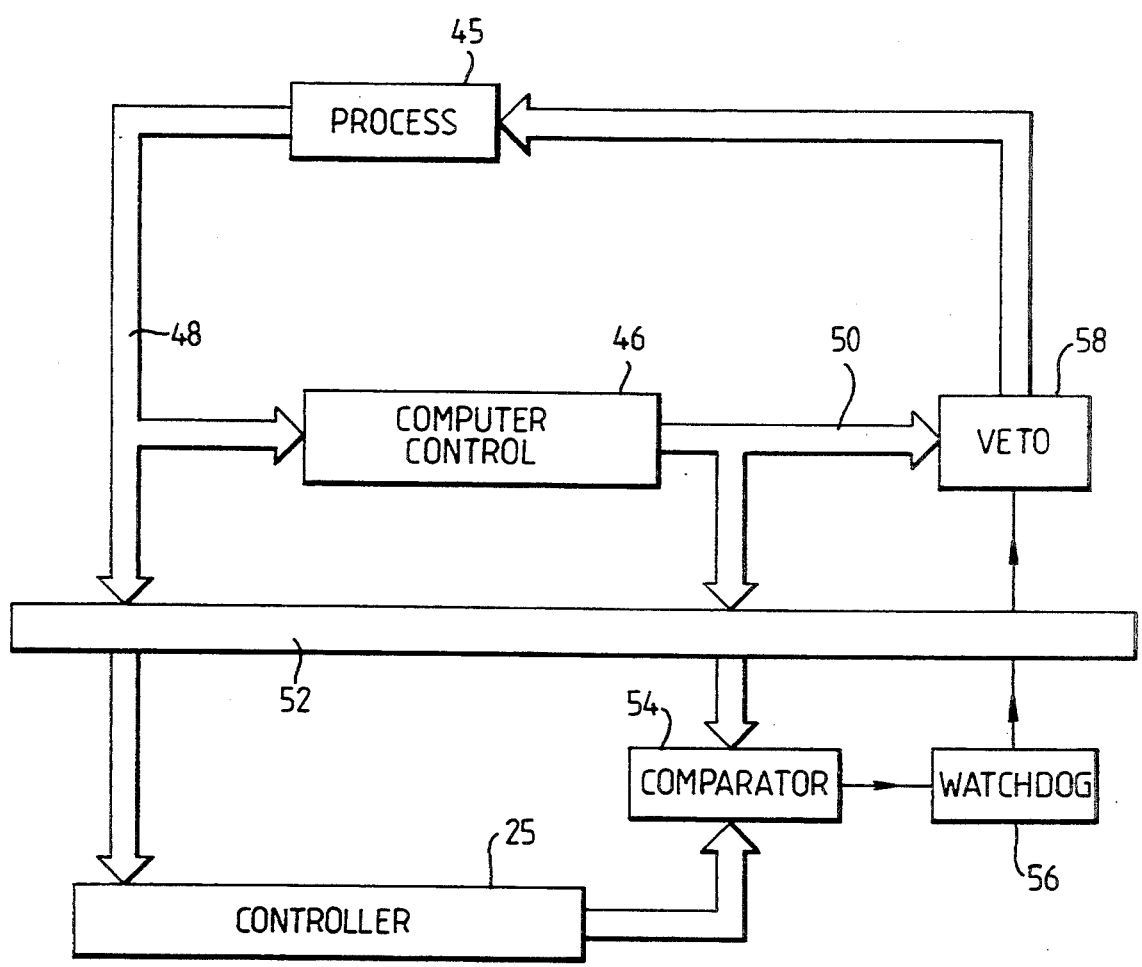
FIG. 3 shows a block diagram of a hard-wired monitoring circuit.

It will also be appreciated that the circuits 10 and 25 of FIGS. 1 and 2 might be used to monitor the operation of a process rather than to control its operation. Referring to FIG. 3 a process 45 is controlled by a programmable computer 46 of a known type, which in response to input signals 48 indicating the state of the process 45 generates appropriate output signals 50 to control actuators. There are eight output signals each of which may be either zero or one (an eight digit binary code), these outputs being dc.

The correct operation of the computer 46 is monitored using a hard-wired controller circuit 25 as in FIG. 2. The input signals 48 are provided, via an optical interface 52, to provide the input signals to the circuit 25; the output signals 50 are provided, via the interface 52, to a comparator 54, to which are also supplied the dynamic output signals from the circuit 25. The output signal from the comparator 54 is supplied to a watchdog unit 56 (retriggerable monostable), which supplies an output signal via the optical interface 52 to an output veto 58 arranged to control the output signals 50 from the computer 46.

In operation as long as the output signals 50 from the computer 46 are the same as the output signals from the circuit 25 (except that the latter are dynamic), the comparator 54 will provide a square-wave signal to the watchdog unit 56, and so the output veto unit 58 will allow the output signals 50 to pass. If they are different the comparator 54 will provide no output, and the watchdog 56 will cause the veto unit 58 to prevent transmission of the output signals 50.

I claim:

1. A hard-wired controlling or monitoring circuit comprising: a plurality of sensor means for sensing parameters relating to the current state of a plant or process and for providing sensor signals indicative of those parameters; means for generating, in response to said sensor signals, first multi-digit binary coded signals representing the sensed current state; means to generate multi-digit binary output coded signals corresponding to said first coded signals, said output coded signals being the requisite signals for controlling the plant or process; a complement generating means to which said first coded signals are supplied, the complement generating means generating as its output multi-digit signals which alternate, at a preset frequency, between being the same as the first coded signals and being the complements of the first coded signals, the output from the complement generating means being supplied as input signals for the output signal generating means, the output signal generating means generating all-zero outputs in response to one or other of the signals received from the complement generating means, so that each non-zero digit of said output coded signals alternates during operation.

2. A circuit as claimed in claim 1 further comprising means for generating from said output put coded signals multi-digit checking coded signals representing the signals to which said output coded signals correspond; and means for comparing said checking coded signals with said first coded signals.

3. A hard-wired controlling or monitoring circuit comprising: a plurality of sensor means for sensing parameters relating to the current state of a plant or process and for providing sensor signals indicative of those parameters; means for generating, in response to said sensor signals, first multi-digit binary coded signals representing the sensed current state; means for generating a sequence of second multi-digit binary coded signals each representing a permissible successive state of the plant or the process; means for comparing said first coded signals and said second coded signals; means responsive to signals from the comparison means to cause the second coded signal generating means to generate coded signals representing the next successive permissible state if said first coded signals and said second coded signals are different; means to generate multi-digit binary output coded signals corresponding to said first coded signals, said output coded signals being the requisite signals for controlling the plant or process; and a complement generating means to which either said first coded signals or said second coded signals are supplied, the complement generating means generating as its output multi-digit signals which alternate, at a preset frequency, between being the same as the signals supplied thereto and being the complements of the signals supplied thereto, the output from the complement generating means being supplied as input signals for the output signal generating means, the output signal generating means generating all-zero outputs in response to one or other of the signals received from the complement generating means, so that each non-zero digit of said output coded signals alternates during operation.

4. A circuit as claimed in claim 3 further comprising means for generating from said output coded signals multi-digit checking coded signals representing the signals to which said output coded signals correspond; and means for comparing said checking coded signals with said first coded signals.

5. A circuit as claimed in claim 3 wherein the output from the complement generating means also provides one of the coded signals compared by the comparison means.

6. A circuit as claimed in claim 3 wherein the output signal generating means generates all-zero output except in response to the complement of a said first or second coded signal.

* * * * *